US011567207B2

(12) United States Patent
Che et al.

(10) Patent No.: US 11,567,207 B2
(45) Date of Patent: Jan. 31, 2023

(54) APPARATUS AND METHOD FOR EFFICIENT POINT CLOUD FEATURE EXTRACTION AND SEGMENTATION FRAMEWORK

(71) Applicant: Oregon State University, Corvallis, OR (US)

(72) Inventors: Erzhuo Che, Corvallis, OR (US); Michael Olsen, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 251 days.

(21) Appl. No.: 16/943,991

(22) Filed: Jul. 30, 2020

(65) Prior Publication Data

US 2021/0048530 A1 Feb. 18, 2021

Related U.S. Application Data

(60) Provisional application No. 62/888,420, filed on Aug. 16, 2019.

(51) Int. Cl.
| | | |
|---|---|---|
| G01S 17/89 | (2020.01) | |
| G01S 7/48 | (2006.01) | |
| G06T 7/13 | (2017.01) | |
| G06T 7/11 | (2017.01) | |
| G06T 7/136 | (2017.01) | |
| G06T 7/174 | (2017.01) | |
| G06T 7/187 | (2017.01) | |

(52) U.S. Cl.
CPC ............ G01S 17/89 (2013.01); G01S 7/4804 (2013.01); G06T 7/11 (2017.01); G06T 7/13 (2017.01); G06T 7/136 (2017.01); G06T 7/174 (2017.01); G06T 7/187 (2017.01); G06T 2207/10028 (2013.01)

(58) Field of Classification Search
None
See application file for complete search history.

(56) References Cited

U.S. PATENT DOCUMENTS

| | | | |
|---|---|---|---|
| 2004/0105573 A1* | 6/2004 | Neumann | G06T 17/00 382/103 |
| 2015/0269770 A1* | 9/2015 | Jenkins | G06T 15/20 345/421 |
| 2016/0259038 A1* | 9/2016 | Retterath | G01S 17/894 |
| 2018/0188738 A1* | 7/2018 | Tatourian | G05D 1/0274 |
| 2020/0116832 A1* | 4/2020 | Singer | G01S 7/4865 |
| 2020/0217964 A1* | 7/2020 | Chen | B60W 60/0027 |
| 2021/0001877 A1* | 1/2021 | Han | G01C 21/3822 |

OTHER PUBLICATIONS

Che et al., "An Efficient Framework for Mobile Lidar Trajectory Reconstruction and Mo-norvana Segmentation."
Che et al., "Fast Edge Detection and Segmentation of Terrestrial Laser Scans through Normal Variation Analysis", ISPRS Ann. Photogramm. Remote Sens. Spatial Inf. Sci., IV-2/W4, 51-57, https://doi.org/10.5194/isprs-annals-IV-2-W4-51-2017, 2017.
Che et al., "Multi-scan segmentation of terrestrial laser scanning data based on normal variation analysis", ISPRS journal of photogrammetry and remote sensing, 143, 233-248.

* cited by examiner

*Primary Examiner* — Xiaolan Xu
(74) *Attorney, Agent, or Firm* — Mughal IP P.C.

(57) ABSTRACT

A computer implemented scheme for a light detection and ranging (LIDAR) system where point cloud feature extraction and segmentation by efficiently is achieved by: (1) data structuring; (2) edge detection; and (3) region growing.

20 Claims, 9 Drawing Sheets

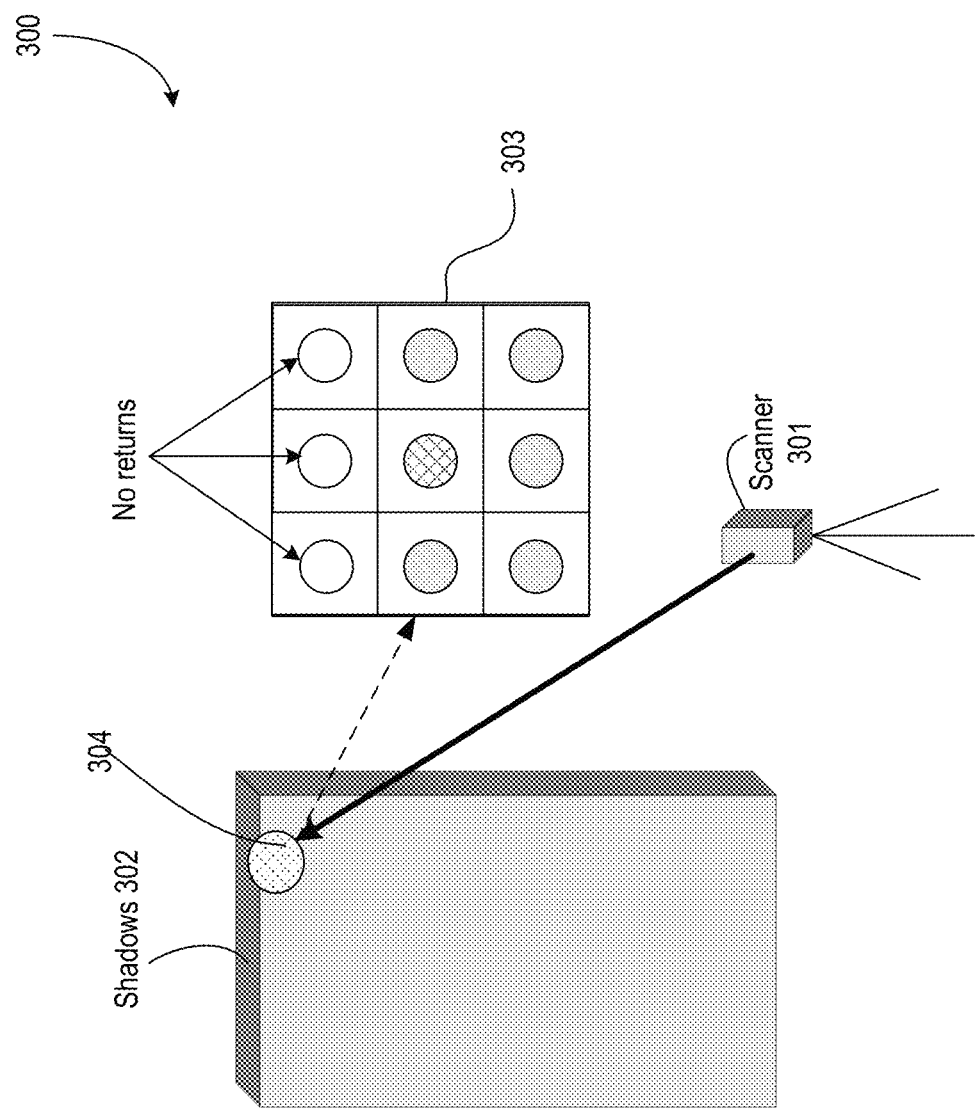

APPARATUS AND METHOD FOR EFFICIENT POINT CLOUD FEATURE EXTRACTION AND SEGMENTATION FRAMEWORK

GOVERNMENT SUPPORT STATEMENT

The embodiments of the invention were made with the support of the Oregon Department of Transportation (ODOT) under Grant/Contract number 30530-17-01, and with the support of the National Science Foundation (NSF) under Grant/Contract number CMMI1351487. The Government has certain rights in the invention.

CLAIM OF PRIORITY

This application claims benefit of priority of U.S. Provisional Application No. 62/888,420 titled "Apparatus and Method for Efficient Point Cloud Feature Extraction and Segregation Framework," filed Aug. 16, 2019.

BACKGROUND

Organizing point cloud data into a data structure is a common processing step to simplify the analysis and ensure efficiency. Tree and grid data structures are two frequently used strategies to enable several components of algorithms (e.g., neighbor searching, visualization) effectively and efficiently. In point cloud processing, a tree data structure (e.g., k-D tree, octree) is usually a point-based strategy to organize the data, where each point serves as a node in the tree and the tree stores the relationships between these nodes. By contrast, structuring the point cloud data into a grid (e.g., 2-D image, 3-D voxel) often starts with a defined grid structure, then each cell in the grid is populated by projecting the point cloud to it. Many existing methods exploit either type of structure in a variety of tasks including storing, processing, analyzing, and visualizing the point cloud data.

However, despite the type of the data structure, most have challenges coping with large volumes of data and the variable spatial distribution, inherent to terrestrial and mobile LIDAR (Light Detection and Ranging) data. For example, the depth of a tree structure can vary dramatically from one branch to another due to the unevenly distributed point cloud, which can result in significantly increased computational complexity. On the other hand, because the grid is pre-defined, a user has to balance the cell size/detail with computation time. Additionally, a lot of grid structures implement down-sampling or re-sampling, which can cause significant information loss or result in wasted memory due to a large number of cells with no data.

DETAILED DESCRIPTION OF DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

Figure 3B:
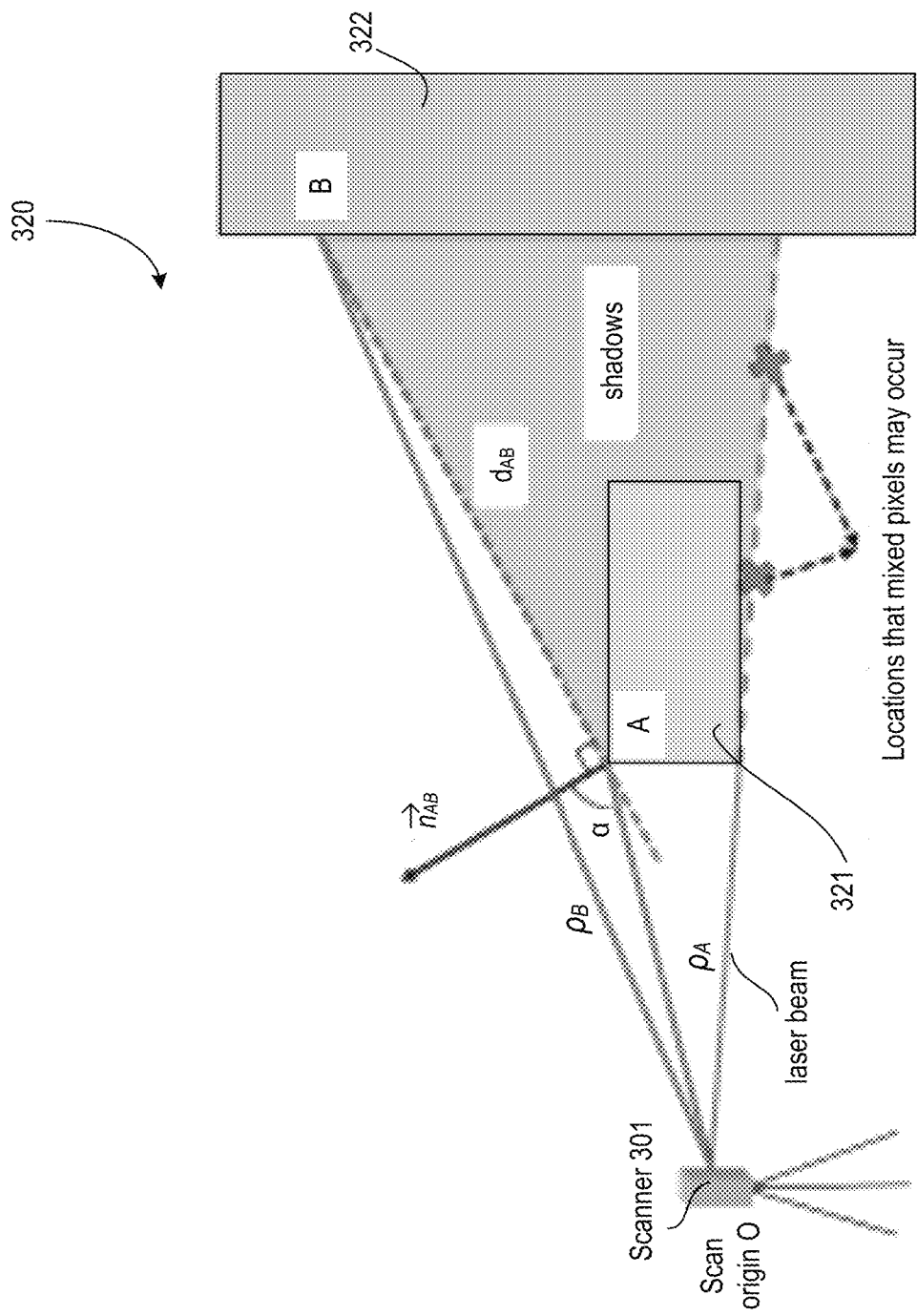
Figure 3C:
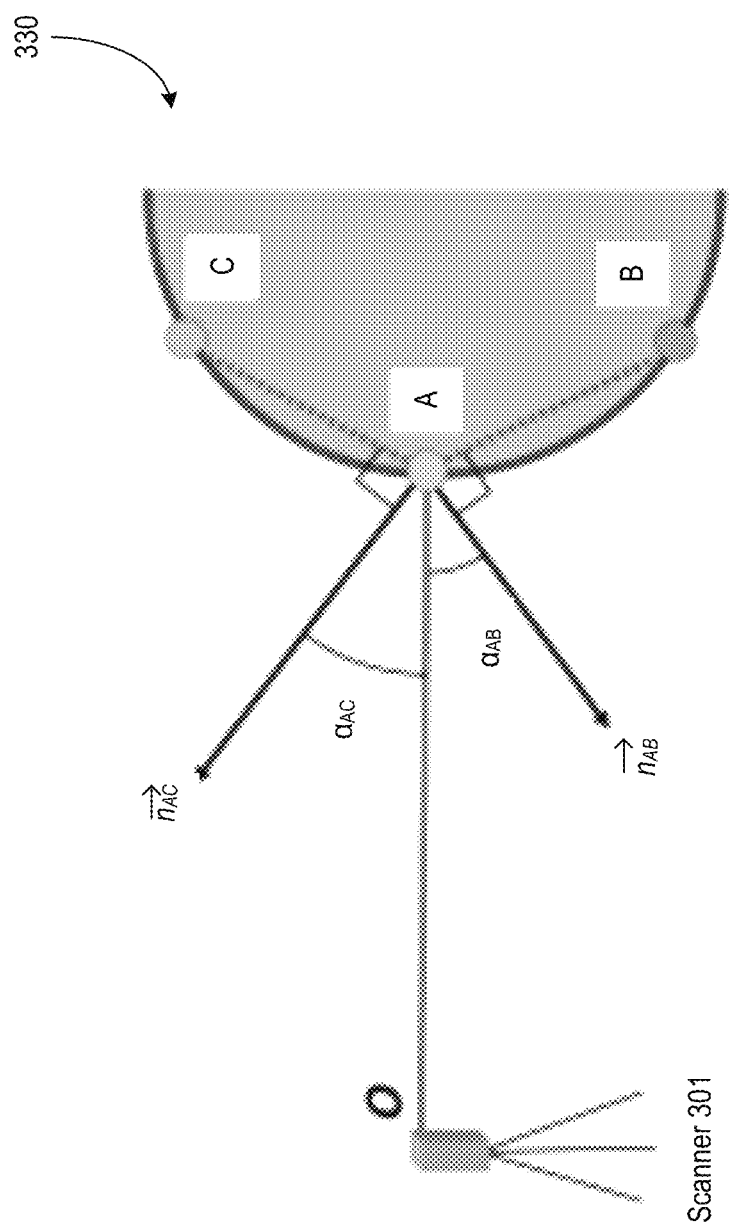

FIGS. 3A-C illustrate schematics showing silhouette edge detection and mixed pixel removal, in accordance with some embodiments.

Figure 4:
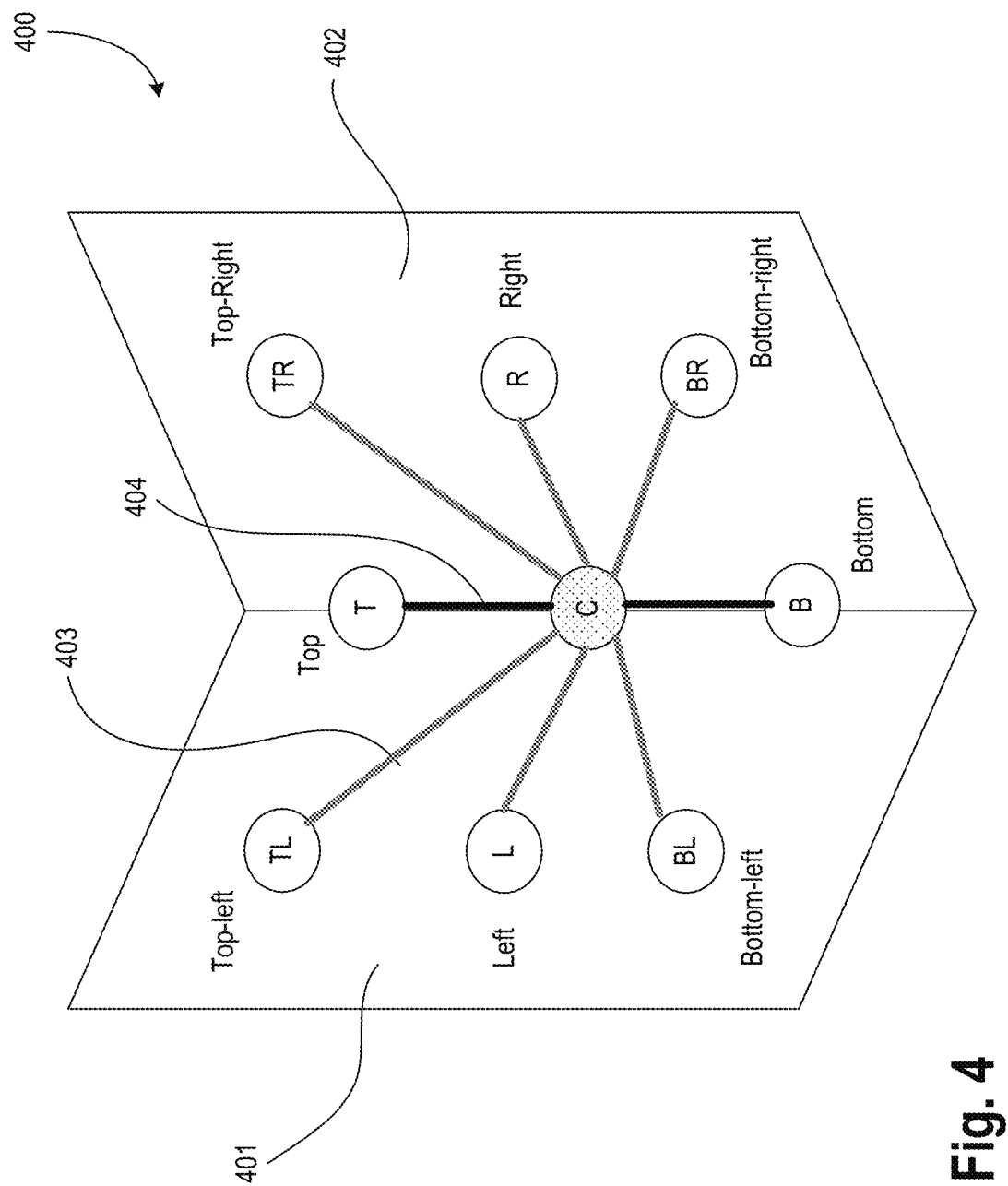

FIG. 4 illustrates a schematic showing intersection edge detection based on normal variation analysis, in accordance with some embodiments.

Figure 5:
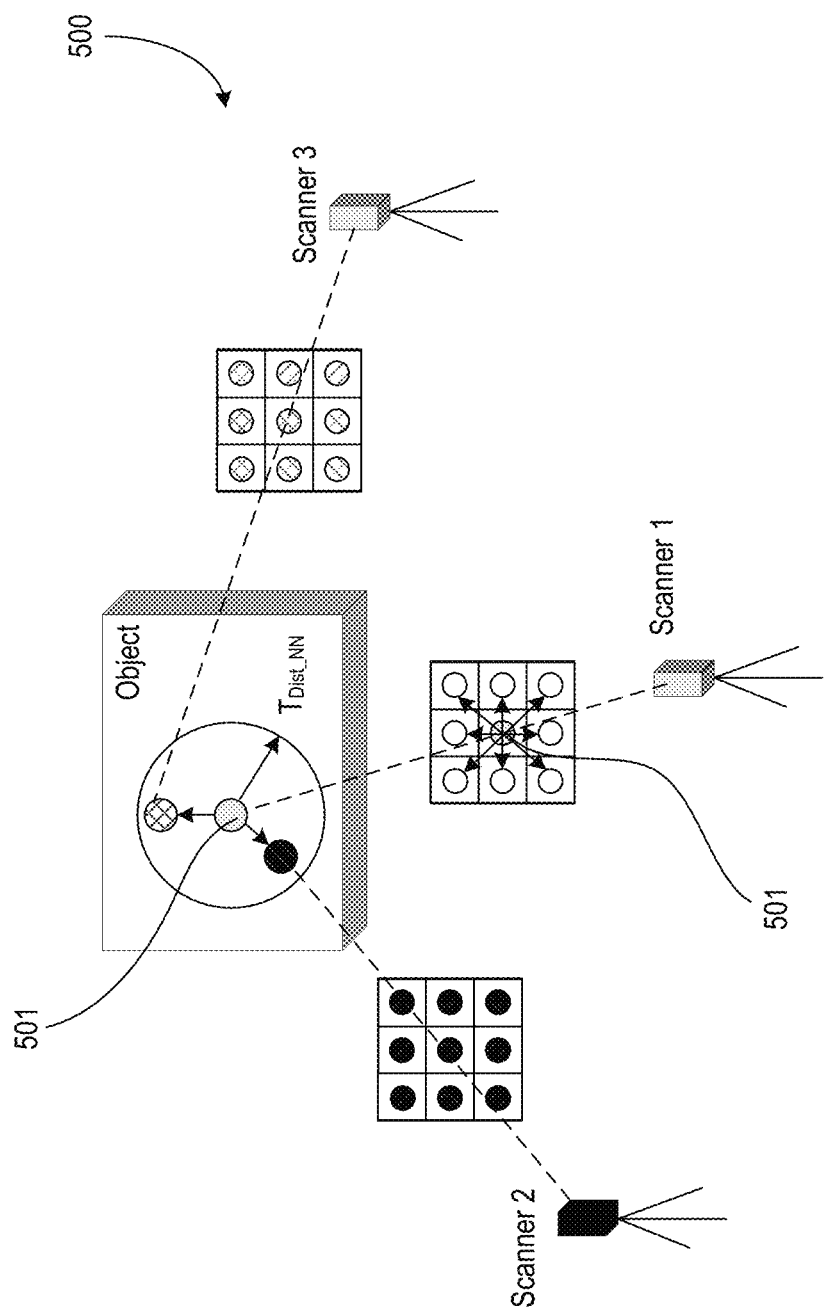

FIG. 5 illustrates a region growing process in multiple scans with scan pattern grid structures, in accordance with some embodiments.

Figure 6:
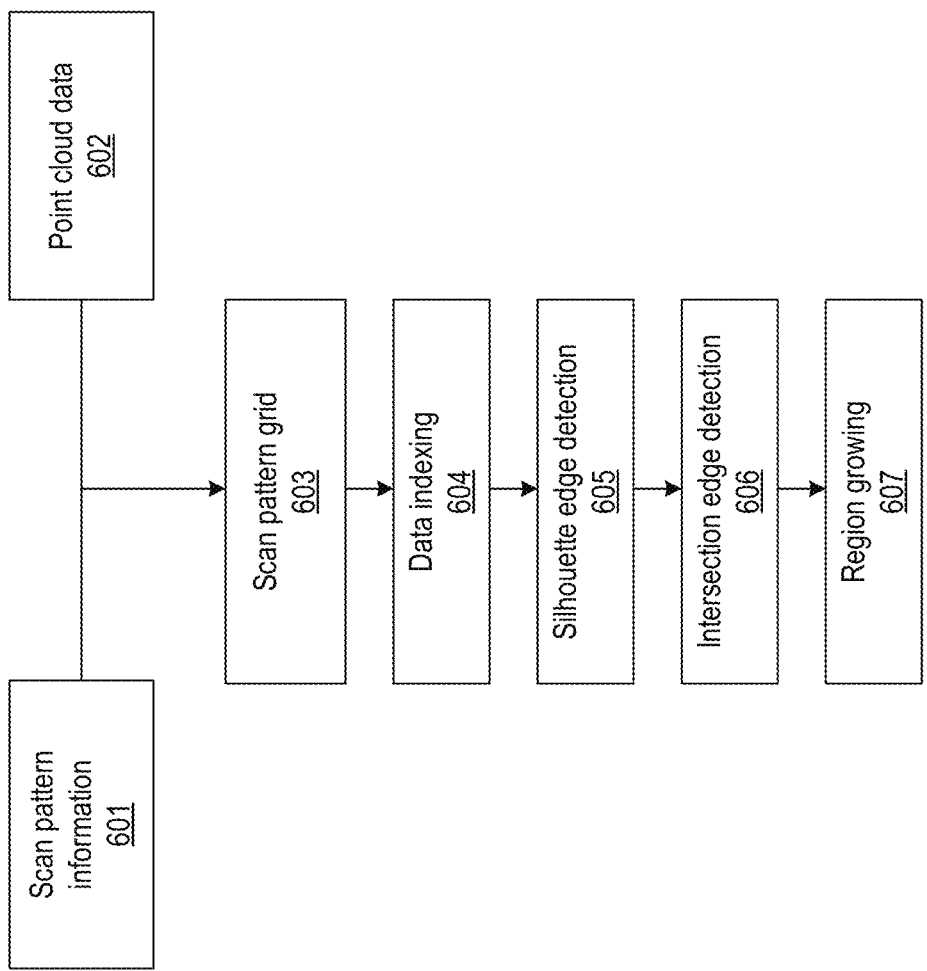

FIG. 6 illustrates a flowchart for efficient point cloud feature extraction and segmentation framework, in accordance with some embodiments.

Figure 7:
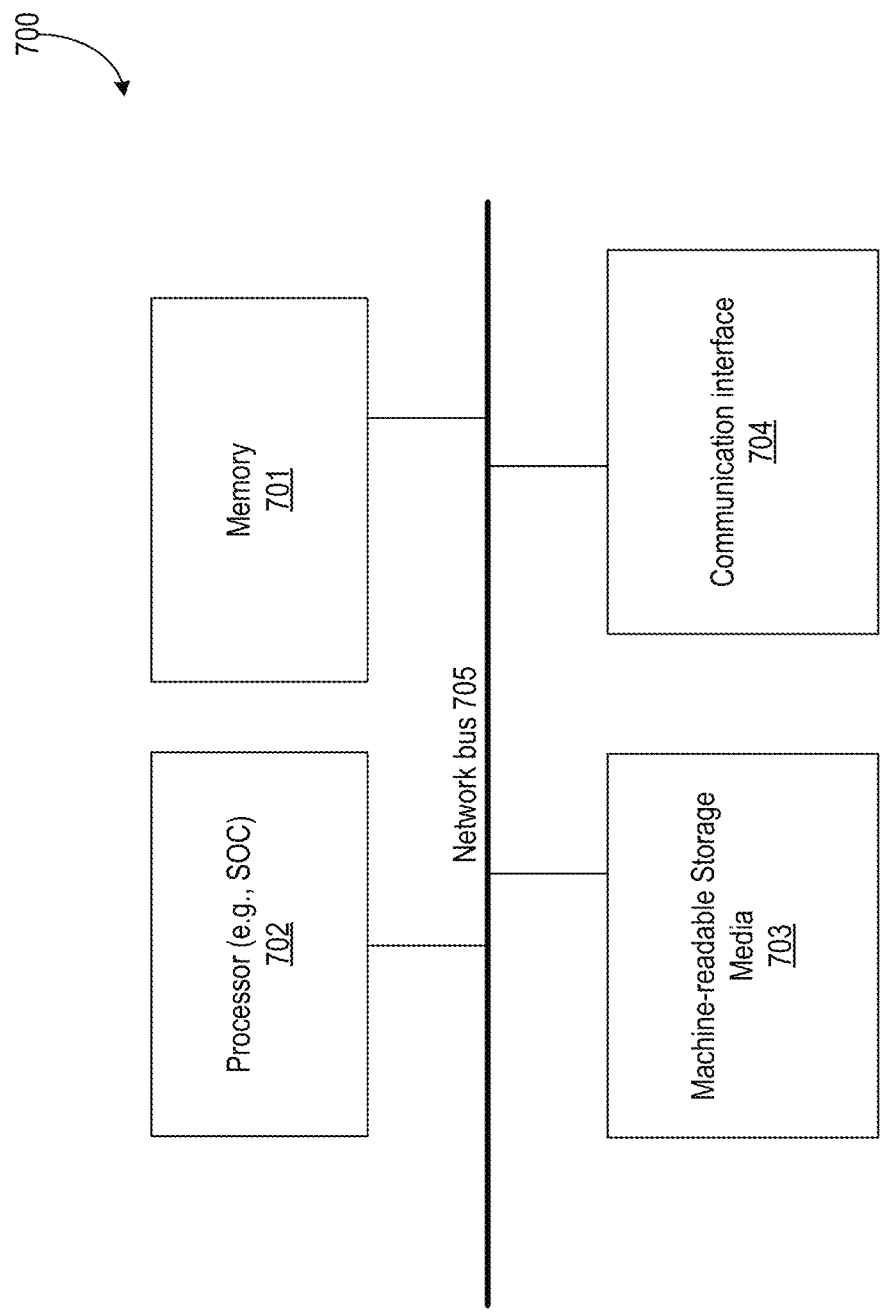

FIG. 7 illustrates a computer system with machine-readable instructions for efficient point cloud feature extraction and segmentation, in accordance with some embodiments.

DETAILED DESCRIPTION OF EXEMPLARY EMBODIMENTS

For point cloud feature extraction and segmentation, there are several challenges. First, many existing segmentation methods require normal estimation before analyzing and grouping the data. Nevertheless, the estimation of normals is highly dependent on the parameters selected for defining the neighbors (e.g., radius in spherical neighborhood or number of neighbor points in k-NN). Despite a number of approaches to adaptively define neighbors, normal estimation can still be unreliable at edges or rough surfaces given that the normal is undefined at an edge by definition.

Second, efficiency is critical for processing LIDAR (light detection and ranging) data due to the immense volume of data. LIDAR is a method for measuring distances (ranging) by illuminating the target with laser light and measuring the reflection with a sensor. Depending on the surface contour of the target and the angle of the laser beams, different laser beams may return at different times. Difference in the laser return times and wavelengths can then be used to make a 3D representation of the target. Some methods down-sample the data or use a small subset of data for testing, which contains significantly fewer points and detail than are present in an actual dataset. The principal challenge with down-sampling the dataset is that the loss of detail can adversely affect the quality of segmentation, particularly when smaller, detailed objects are of interest.

Third, for machine-learning approaches, it can be difficult and time consuming to collect sufficient training samples to segment a dataset. In addition, for each dataset, a highly specific training dataset may be needed because of the differences in the scan set-up (e.g., scan positions, scan resolution) and the nature of a scene (e.g., types of objects and the corresponding distinguishable attributes).

Fourth, some methods use the colormetric information co-registered to the point cloud data. Although most LIDAR systems have an integrated camera, the photographic images and the point cloud data are usually not collected simultaneously, resulting in inconsistencies as a result of the temporal difference (several minutes) in acquisition. Consequently, occlusion effects from moving objects in the scene may cause the segmentation to fail. Moreover, photographic images suffer from variances in lighting throughout the scene such as shadows, which are prevalent throughout an outdoor scene.

Fifth, several methods utilize intensity as an attribute for segmentation because intensity is collected with the point cloud simultaneously and ordinarily not affected by the lighting condition. Nevertheless, for high quality results, radiometric calibration is usually necessary to provide consistent intensity information as a result of degradation due to factors such as range and incidence angle. While normalizing or transforming intensity values to reflectance is as simple as applying an energy transmission model to each point, deriving the coefficients of the model through a radiometric calibration requires substantial effort through rigorous testing of scanning different materials on the site under a wide range of geometric conditions (e.g., range and incidence angle). The calibration is also unique to a specific scanner.

To overcome the challenges mentioned above, some embodiments achieve point cloud feature extraction and segmentation by: (1) data structuring, (2) edge detection, and (3) region growing.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices.

The term "module" or "logic" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Some embodiments achieve point cloud feature extraction and segmentation by: (1) data structuring; (2) edge detection; and (3) region growing.

Figure 1:
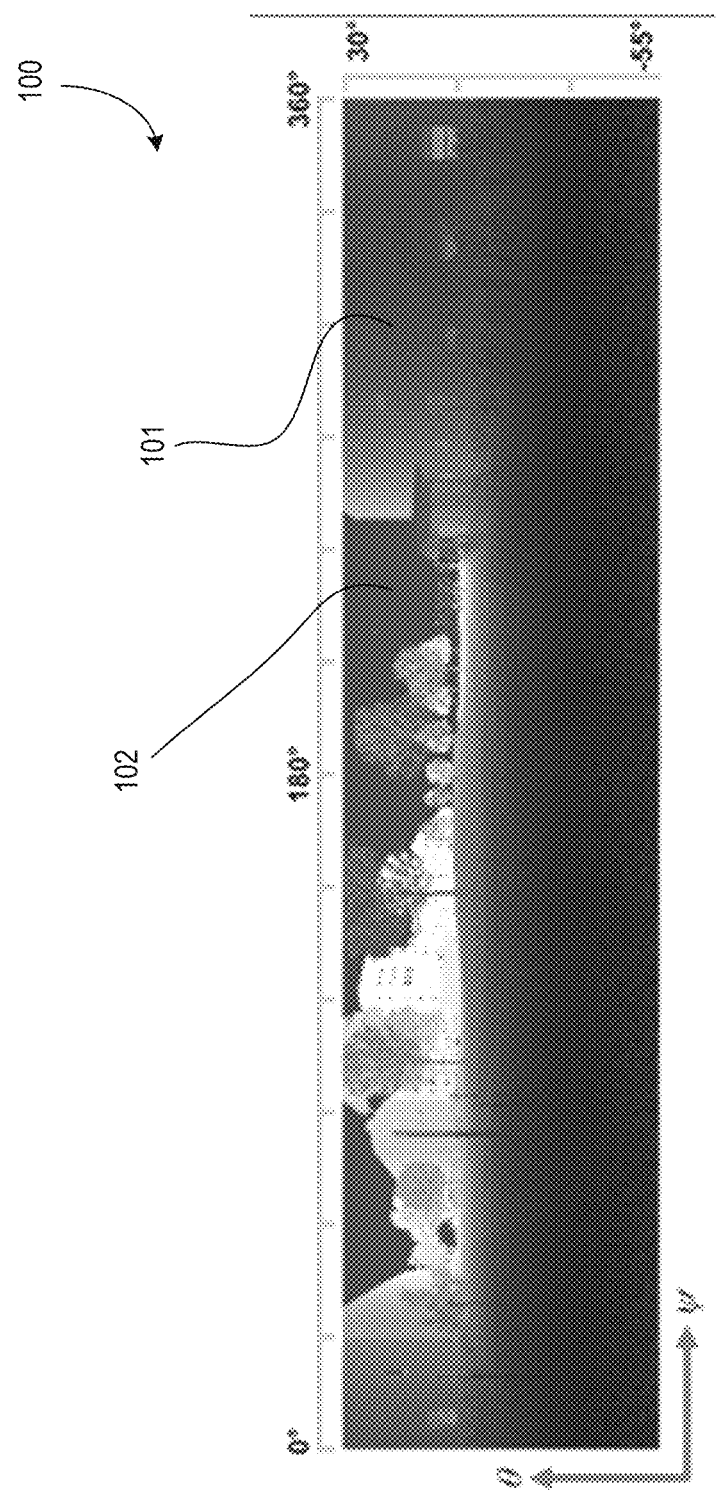
FIG. 1 illustrates a terrestrial light detection and ranging (LIDAR) scan visualized via an angular grid structure, in accordance with some embodiments.

FIG. 1 illustrates a terrestrial LIDAR scan 100 visualized via an angular grid structure, in accordance with some embodiments. Here, $\Psi$ and $\theta$ are horizontal and vertical angles, respectively. The grayscale 101 illustrates the 3-D ranges while pixels 102 represent the laser beams with no return.

Data Structuring: First, the point cloud data is structured in a scan pattern grid. The data structure called scan pattern grid is a function of how the point cloud data is acquired. Taking the terrestrial LIDAR scan as an example, where the data are collected at constant horizontal and vertical angular increments, a 2-D grid structure (referred as scan pattern grid) can be generated where each row and column correspond to a vertical $\theta$ angle and a horizontal $\Psi$ angle, respectively, as shown in FIG. 1.

Here, each cell in this grid represents a laser pulse, which can store the information of a return point (e.g., scan coordinates, color, and intensity). Because this structure aligns with the pre-defined scan pattern during the data collection, it may not require parameters based on the scan geometry, scene type, and other factors. These parameters can be error prone or result in inefficiencies in computation. Many scanners provide overlap at the 360° mark, which are easily handled with this data structure. Note, there are also no-data cells in such grid, however, the no-data cells in this grid represent the laser pulses with no return, which can provide useful information. Because the scan pattern grid essentially stores the information by each laser pulse rather than each point, multiple returns from one laser pulse can be easily identified and stored in one cell.

Figure 2:
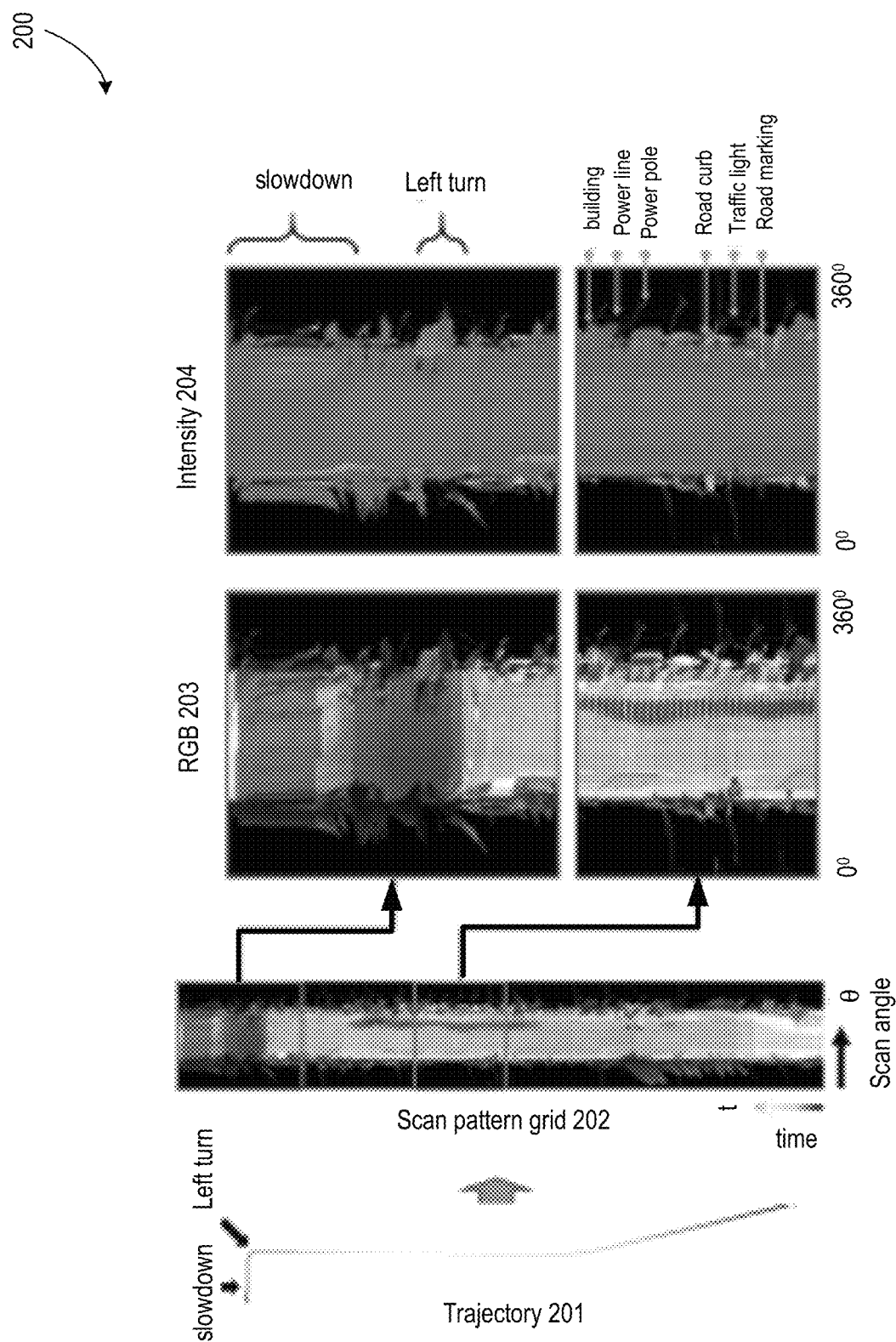
FIG. 2 illustrates a process of structuring the mobile LIDAR data into a scan pattern grid, in accordance with some embodiments.

Note, that such an idea is not limited to a stationary system, but is also applicable to the data acquired on a moving platform, in accordance with various embodiments. For example, applying the idea to a mobile LIDAR system, the axes of the scan pattern grid would be time and scan angle $\theta$ such that the axes are independent from each other as shown in FIG. 2. FIG. 2 illustrates process 200 of structuring the mobile LIDAR data into a scan pattern grid.

To generate a scan pattern grid for a mobile LIDAR system, the scan angle and time stamp of each point needs to be available. In some cases, such information can be derived from the trajectory 201 of the scanner (e.g., the position and orientation of the scanner at any given moment). The points can be then organized in a 2-D grid with all the information associated with each point stored (e.g., red, green, blue (RGB) 203, intensity 204). Here, a scan pattern grid is for terrestrial LIDAR scan 100 while scan pattern grid 202 is for a mobile LIDAR system.

Once the point cloud of each scan is structured to a scan pattern grid 202, the neighbors of each point can be simply defined as its neighbor cells in the data structure. For example, in a terrestrial LIDAR scan, an 8-neighbor of a point can be directly defined in the scan pattern grid. In other cases, the definition of the neighbor points can vary based on the configuration of the LIDAR system. For a mobile LIDAR system, if the scan profile is not perpendicular to the driving direction, the closest points on the adjacent scanlines are selected as the neighbor points.

Edge Detection: In the stage of edge detection, the point cloud is classified into three categories including silhouette edge, intersection edge, and smooth surface. Such analysis is referred to as normal variation analysis. It utilizes the scan pattern grid for defining the neighbor points and each step is performed independently for each point, such that parallel programming can be easily implemented.

Silhouette edge detection: Because of the low power of a LIDAR scanner, either visible or near-infrared laser pulses used in LIDAR scans do not normally penetrate most objects except for the transparent and translucent ones, resulting in occlusions or data gaps (shadows) occurring behind an object observed in a single scan. Here, the points lying on the edge between an object and the shadows are defined as the silhouette edges. There are two main situations resulting in silhouette edges, which behave differently in a LIDAR scan. Both are considered in our approach by checking all the points (laser pulses) with valid returns and skipping those without returns.

The first situation often occurs at the boundary of a roof or a window in an outdoor scene when there is nothing captured by the laser behind the object. As a result, there will be one or more adjacent neighbor points (laser pulses) with no return, and they can be simply detected by checking the eight adjacent neighbors (or any number of adjacent neighbors) of a point to determine if it is a silhouette edge point as shown in FIG. 3A. FIG. 3A illustrates a schematic 300 illustrating silhouette edge detection and mixed pixel removal. Schematic 300 shows scanner 301, shadows 302, and a scan pattern grid structure 303. In a first situation, a silhouette edge 304 occurs in a scan by scanner 301. Note that laser pulses with no returns are recorded in scan pattern grid structure 303 for a LIDAR scan.

In a second situation, there is another object detected behind the front object, resulting in a significant change in range and a shadow produced between these two objects. In some embodiments, the shadows between two objects can be assumed as an imaginary surface with a large incidence angle where the boundary of the surface is the silhouette edge while the mixed pixels are between the silhouette edges of these objects.

By making these assumptions to model the shadows rather than the relationships between different objects, the criteria can be simplified, in accordance with some embodiments. The silhouette edge points and the mixed pixels can be then distinguished by further checking if the point with a large proxy incidence angle is, in fact, lying on an object. Nevertheless, computing the incidence angle can still be unreliable because it requests a normal estimation on a surface which does not actually exist. To solve this problem, in some embodiments, a proxy incidence angle is defined as the angle on the 2D plane defined by the current point, its adjacent neighbor, and the scan origin as illustrated by FIG. 3B.

FIG. 3B illustrates a schematic 320 of silhouette edge detection and mixed pixel removal. Silhouette edge detection based on the proxy incidence angle-point A lying on object 321 is the current point under analysis while point B lying on object 322 is one of its adjacent neighbor points. Here, $d_{AB}$, $\rho_A$ and $\rho_B$ are the distances between A and B, and their 3D Euclidean distances from the scan origin O, respectively; $n_{AB}$ is one component of the normal of AB, which is coplanar with triangle OAB, and lastly the corresponding proxy incidence angle is $\alpha$. Note that if the footprint of a laser beam from scanner 301 covers both two objects (A and B) and they are located close to one another, mixed pixels may occur between two objects (dash line of laser beam)

The proxy incidence angle is considered as an estimation of the actual incidence angle in a certain direction and can be computed using the cosine law:

$$\alpha = \left| \text{acos}\left(\frac{\rho_A^2 + d_{AB}^2 - \rho_B^2}{2\rho_A d_{AB}}\right) - 90° \right|$$

By computing the proxy incidence angles at a point with all its eight neighbors, not only can this analysis be conducted in different directions but also allows more aggressive detection of mixed pixels and silhouette edges, resulting in more robust segmentation as shown by FIG. 3C.

FIG. 3C illustrates schematic 330 of silhouette edge detection and mixed pixel removal, in accordance with some embodiments. Schematic 330 (exaggerated or zoomed) compares between the proxy incidence angle and the actual incidence angle—Point A, B, and C are three points lying on a smooth surface where the actual incidence angle of point A is 0°. Here, $\alpha_{AB}$ and $\alpha_{AC}$ are the proxy incidence angles at point A computed with its neighbor points B and C, respectively. As shown in FIG. 3C, the proxy incidence angles are larger than the actual incidence angle to be more aggressive in detecting silhouette edges and mixed pixels.

A point is labeled as a silhouette edge candidate (which includes both the silhouette edges and mixed pixels) if any proxy incidence angle at this point exceeds the given threshold of the maximum incidence angle $T_\alpha$. Then, the adjacent neighbors of each silhouette edge candidate are checked. If any of its neighbors are not labeled as a silhouette candidate, the point is labeled as a silhouette edge point. Otherwise, it is labeled as a mixed pixel. Although using the method of some embodiments may mislabel distant points lying on an oblique surface such as ground points, those points would likely not be utilized directly since they suffer from low point density, poor ranging accuracy, and limited capability of capturing the geometry features. If that area is of interest, additional scans would capture that section. As a result, the threshold $T_\alpha$ is a function of the scan's angular resolution as well as the maximum acceptable obliquity (i.e., incidence angle) for a scan of a surface.

Sometimes the scan pattern may not rigorously align with how the scanner actually scans, which may cause some false positive detection of silhouette edge points under the first situation described above. To cope with that, more criteria can be added to confirm whether a point should be classified as a silhouette edge. For instance, a minimum 3D (three dimensional) distance between a point and its neighbor can be added as a threshold, and if the distance between two points are smaller than the threshold, even when there is a gap between these two in the scan pattern grid, they may not be classified as silhouette edge.

Intersection Edge Detection: An intersection edge is defined as the intersection of multiple smooth surfaces. In some embodiments, after extracting the silhouette edges, the intersection edges in each scan are detected without using the normal vector at each point such that the method of various embodiments is independent from a general normal estimation. As a result, the normals on smooth surfaces can be further used in the following process and analysis while the intersection edges can be handled differently. In various embodiments, there are three steps for the intersection edge detection at each point: (1) a triangular mesh is generated around this point with its neighbors, resulting in shared edges between these triangles; (2) the normal of each triangle is then computed, and the normal gradient across each shared edge determines if this point is lying on an intersection edge or smooth surface; and (3) the result is further refined.

In the first step, taking 8-neighbor as an example, at each point that is not labeled as a silhouette edge point, a neighbor point in each of the eight directions is searched in the scan pattern grid structure within a given threshold of minimum distance $T_{Dist\_TIN}$ from this center point. Within these neighboring points, normal variation analysis can be performed in a relatively consistent scale such that the over-segmented artifacts caused by the mismatch between the point density and target level of detail can be limited without needing to resample the data. The search stops at a point that is labeled as silhouette edge. Once the neighboring points at the current point under analysis are defined, a triangular mesh is generated where the current point is a vertex shared by all the triangles as discussed with reference to FIG. 4.

FIG. 4 illustrates schematic 400 showing intersection edge detection based on normal variation analysis: Point C is the center point being analyzed with its eight neighbors (TL, L, BL, T, B, TR, R, and BR) in the scan pattern grid structure, where TL is top-left point, L is the left-point, BL is the bottom-left point, T is the top point, B is the bottom point, TR is the top-right point, R is the right point, and BR is the bottom-right point. Points T, C, and B lie on or nearly on the intersection of two planes 401 and 402, while the other points lie on only one of the planes.

The normal of each triangle is calculated by the cross-product between any two edges. Note that because the normal computed this way can point either inside or outside from the surface, the orientation towards the scan origin is considered to ensure that all normal vectors point outside the surface. Then, the normal gradient across each shared edge (403 and 404 edges in FIG. 4) is computed by its adjacent triangles and the maximum gradient is compared against a specified threshold of maximum normal gradient, $T_{\Delta Norm}$, to label the current point as an intersection edge point or a smooth surface point.

The previous analysis creates a buffer near the actual intersection edge with a width of $T_{Dist\_TIN}$ approximately, where the points in the buffer are classified as intersection edge points. Thus, the normal at each point is estimated and the points in the buffer are analyzed to determine if they should be classified to the smooth surface nearby by using the threshold of $T_{\Delta Norm}$. To further refine the results after the analysis is performed to all the scans individually, all of the edge points in each scan are mapped to the other scans. For a point labeled as an intersection edge point, its nearest neighbor within the given threshold $T_{Dist\_NN}$ in another scan is searched and labeled as an intersection edge point.

Region growing: The basic idea of region growing is to start from a seed point and grow to its neighbors iteratively by meeting a given criteria, producing clusters of homogeneous points continuous in space. This idea is adapted to segment the classified point clouds into groups.

First, region growing in the scan pattern grid is performed within the smooth surface points, where the edge points can serve as the boundary of a segment, which improves the robustness of a typical region growing process. All the smooth surface points are potential seed points and two criteria are met during the growing process: (1) the difference in normals between two points is smaller than $T_{\Delta Norm}$; and (2) the displacement of a neighbor point in the normal direction to the current point under analysis is smaller than $\sin(0.5*T_{\Delta Norm})*T_{Dist\_TIN}$. Note during the growing process, the neighbor points in both the same and different scans is analyzed. The neighbor points in the different scans can be searched by a point indexing process which models the relations between multiple scan pattern grids mathematically.

FIG. 5 illustrates a region growing process 500 in multiple scans with scan pattern grid structures, in accordance with some embodiments. This figure illustrates an example of region growing process for terrestrial LIDAR scans.

The point 501 in from scanner #1 is the current point being considered during the region growing. It is growing to its eight neighbors in the same scan as well as its nearest neighbors in the other scans (from scanners #2 and #3) with the given threshold $T_{Dist\_NN}$ for the neighbor searching.

Once the growing process is completed for a segment, if the dimension $T_{Dim\_Seg}$ and point counts $T_{Npts\_Seg}$ meet the user given threshold, a unique segment ID is assigned. Then, another round of region growing is performed within the intersection edge points and smooth surface points without a segment ID being assigned. The rules used in this step are the same while the threshold can vary depending on the scene type.

In various embodiments, the input point clouds should include scan pattern information such as the row and column index stored at each point in an ASTM E57 format for a terrestrial LIDAR scan, and scanner trajectory data for a mobile LIDAR data.

The scheme of various embodiments works for the point cloud generated from structure-from-motion (sfm), photogrammetry, Unmanned Aircraft System (UAS) lidar system, airborne lidar system, and others. Additionally, the framework of various embodiments is applicable to other forms of data (e.g., images, signals) for applications such as feature extraction, classification, pattern recognition, etc.

The scheme of various embodiments can be implemented as a standalone software that can extract features and segment the point clouds into groups; as a built-in function in other software that can extract features and perform segmentation for further visualization, analysis, and applications; as a built-in function on the firmware of a LIDAR system that can preprocess the point cloud and achieve basic tasks (e.g., data cleaning, selecting objects of interest) in the scanner operation interface, etc.

FIG. 6 illustrates flowchart 600 for efficient point cloud feature extraction and segmentation framework. While the blocks in flowchart 600 are shown in a particular order, the order can be modified. For example, some blocks are performed before others while other points are performed simultaneously or in parallel to others.

At blocks 601 and 602, input data including scan pattern information and point cloud data is procured for forming a scan pattern grid. At block 603, a scan patter grid (a data structure) is formed which is a function of how the point cloud data is acquired. Taking the terrestrial LIDAR scan as an example, where the data are collected at constant horizontal and vertical angular increments, a 2-D grid structure (referred as scan pattern grid) can be generated where each row and column correspond to a vertical angle and a horizontal angle, respectively.

At block 604, data in the scan pattern grid is indexed. In some embodiments, each cell in the scan pattern grid represents a laser pulse, which can store the information of a return point (e.g., scan coordinates, color, and intensity). The scan pattern grid may store the information by each laser pulse rather than each point. As such, multiple returns from one laser pulse can be easily identified and stored in one cell of the scan pattern grid. Once the point cloud of each scan is structured to the scan pattern grid, the neighbors of each point can be simply defined as its neighbor cells in the data structure.

At blocks 605 and 606, edge detection is performed. Here, the point cloud is classified into three categories including silhouette edge, intersection edge, and smooth surface. Such analysis is referred to as normal variation analysis. It utilizes the scan pattern grid for defining the neighbor points and each step is performed independently for each point, such that parallel programming can be easily implemented. The points lying on the edge between an object and its shadows are defined as the silhouette edges. To detect silhouette edges, noise removal and powerline extraction are performed. The mixed pixels can also be removed as noise in this process by examining whether the silhouette edges lie on an object or between multiple objects. Silhouette edge detection is described with reference to FIGS. 3A-C.

Referring back to FIG. 6, an intersection edge is defined as the intersection of multiple smooth surfaces. To detect intersection edge, line drawing and data reduction is performed. Line drawing and data deduction are the potential application of the edge detection approach of various embodiments. A line drawing and data reduction process can be performed by fitting straight line segments to the edge points and using them to represent and visualize an object instead of a number of points (e.g., millions of points). In various embodiments, there are three steps for the intersection edge detection at each point: (1) a triangular mesh is generated around this point with its neighbors resulting in shared edges between these triangles; (2) the normal of each triangle is then computed, and the normal gradient across each shared edge determines if this point is lying on an intersection edge or smooth surface; and (3) the result is further refined. Intersection edge detection is described with reference to FIG. 4.

At block 607, region growing is performed as described with reference to FIG. 5. Region growing starts from a seed point (e.g., a smooth surface point) and grows to its neighbors iteratively by meeting a given criteria (e.g., difference in normals). Region growing is the approach to segment the point cloud. Once the point cloud is segmented, other applications (e.g., classification and ground filtering) can be done by analyzing each segment. The silhouette edges and intersection edges detected from the edge detection approach can form boundaries around each smooth surface, which serves as another criterion in region growing process. As such, clusters of homogenous points are formed in space. The outcome of region growing is the segmentation result. It can be then utilized for other applications such as ground filtering (e.g., a process to extract ground points) and classification (e.g., categorize each point) by analyzing each segment with some constraints (e.g., elevation, normal, roughness, height, etc.).

FIG. 7 illustrates a computer system 700 (e.g., a LIDAR system) with machine-readable instructions for efficient point cloud feature extraction and segmentation, in accordance with some embodiments. Elements of embodiments (e.g., FIG. 6 and other embodiments) are also provided as a machine-readable medium (e.g., memory) for storing the computer-executable instructions (e.g., instructions to implement any other processes discussed herein). In some embodiments, computing platform comprises memory 701, processor 702, machine-readable storage media 703 (also referred to as tangible machine-readable medium), communication interface 704 (e.g., wireless or wired interface), and network bus 705 coupled together.

In some embodiments, processor 702 is a Digital Signal Processor (DSP), an Application Specific Integrated Circuit (ASIC), a general-purpose Central Processing Unit (CPU), or a low power logic implementing a simple finite state machine to perform the method of flowcharts of FIG. 6 and/or various embodiments, etc.

In some embodiments, the various logic blocks of system are coupled via network bus 705. Any suitable protocol may be used to implement the Network Bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with flowcharts of FIG. 6 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts of FIG. 6 (and/or various embodiments) are executed by the computer system.

In some embodiments, the program software code/instructions associated with flowchart of FIG. 6 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium 703 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions (associated with flowcharts FIG. 6 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 703 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, machine-readable storage media 703 includes instructions stored thereon, that when executed, cause one or more processors 702 to perform an operation for a LIDAR system where point cloud feature extraction and segmentation is performed. The operation comprises receiving scan pattern information and point cloud data from the LIDAR system, wherein the scan pattern information and point cloud data are associated with a physical object; generating a scan pattern grid from the scan pattern information and point cloud data; detecting one or more silhouette edges using the scan pattern grid and the point cloud data; detecting one or more intersection edges using the scan pattern grid and the point cloud data; and growing a region based on the detected silhouette edge and intersection edge.

In some embodiments, the scan pattern grid is a 2-D grid structure having cells organized in rows and columns, wherein an individual row corresponds to a vertical angle of a scan from a scanner of the LIDAR system, and wherein an individual column corresponds to a horizontal angle from of the scan from the scanner of the LIDAR system. In some embodiments, the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from of the scan from the scanner of the LIDAR system. In some embodiments, an individual cell of the scan pattern grid represents a laser pulse from the scanner, wherein the individual cell includes information of a return point, wherein the information of the return point includes scan coordinates, color, and intensity. In some embodiments, the one of more silhouette edges comprises points lying on an edge between an object scanned by the LIDAR system and a shadow of the object.

In some embodiments, the operation of detecting one or more silhouette edges comprises: determining, from the scan pattern grid, points with no return; and identifying points in the scan pattern grid points that neighbor the points with no return as a silhouette edge points, wherein the silhouette edge points form the one or more silhouette edges. In some embodiments, the operation of detecting one or more silhouette edges comprises: determining mixed points, between two objects, from the scan pattern grid; distinguishing silhouette edge points of the two objects from the mixed points by determining whether an incidence angle associated with a point in the scan pattern grid is on one of the two objects; comparing the incidence angle, associated with a point, against a threshold; identifying the point as a silhouette edge point if the incidence angle exceeds the threshold, wherein the silhouette edge point forms the one or more silhouette edges; and identifying the point as a mixed point if the incidence angle is below the threshold.

In some embodiments, the one or more intersection edges intersect two or more smooth surfaces. In some embodiments, the operation of detecting one or more intersection edges is independent of a normal vector at each point of the scan grid pattern. In some embodiments, the operation of detecting one or more intersection edges comprises: generating a triangular mesh around a point, which is not a silhouette edge point, of the scan grid pattern with neighbor points forming shared edges between triangles of the triangular mesh; and computing normal gradient across each shared edge to determine whether the point is lying on an intersection edge of a smooth surface.

In some embodiments, the operation of detecting one or more intersection edges comprises comparing a maximum normal gradient, from among the computed normal gradient across each shared edge, with a threshold of maximum normal gradient. In some embodiments, the scan pattern grid is a first scan pattern grid, wherein growing the region comprises: analyzing points in first scan pattern grid and a second scan pattern grid; and generating clusters of homogeneous points continuous in space.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims. Where specific details are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Various embodiments described herein are illustrated as examples. The features of these examples can be combined with one another in any suitable way. These examples include:

Example 1: A machine-readable storage media having instructions stored thereon, that when executed, cause one or more processors to perform an operation for a LIDAR system where point cloud feature extraction and segmentation is performed, the operation comprising: receiving scan pattern information and point cloud data from the LIDAR system, wherein the scan pattern information and point cloud data are associated with a physical object; generating a scan pattern grid from the scan pattern information and point cloud data; detecting one or more silhouette edges using the scan pattern grid and the point cloud data; detecting one or more intersection edges using the scan pattern grid and the point cloud data; and growing a region based on the detected silhouette edge and intersection edge.

Example 2: The machine-readable storage media of example 1, wherein the scan pattern grid is a 2-D grid structure having cells organized in rows and columns, wherein an individual row corresponds to a vertical angle of a scan from a scanner of the LIDAR system, and wherein an individual column corresponds to a horizontal angle from of the scan of the scanner of the LIDAR system.

Example 3: The machine-readable storage media of example 1, wherein the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from of the scan of the scanner of the LIDAR system.

Example 4: The machine-readable storage media of example 2, wherein an individual cell of the scan pattern grid represents a laser pulse from the scanner, wherein the individual cell includes information of a return point, wherein the information of the return point includes scan coordinates, color, and intensity.

Example 5: The machine-readable storage media of example 1, wherein the one of more silhouette edges comprises points lying on an edge between an object scanned by the LIDAR system and a shadow of the object.

Example 6: The machine-readable storage media of example 1, wherein detecting one or more silhouette edges comprises: determining, from the scan pattern grid, points with no return; and identifying points in the scan pattern grid points that neighbor the points with no return as a silhouette edge points, wherein the silhouette edge points form the one or more silhouette edges.

Example 7: The machine-readable storage media of example 1, wherein detecting one or more silhouette edges comprises: determining mixed points, between two objects, from the scan pattern grid; distinguishing silhouette edge points of the two objects from the mixed points by determining whether an incidence angle associated with a point in the scan pattern grid is on one of the two objects; comparing the incidence angle, associated with a point, against a threshold; identifying the point as a silhouette edge point if the incidence angle exceeds the threshold, wherein the silhouette edge point forms the one or more silhouette edges; and identifying the point as a mixed point if the incidence angle is below the threshold.

Example 8: The machine-readable storage media of example 1, wherein the one or more intersection edges intersect two or more smooth surfaces.

Example 9: The machine-readable storage media of example 1, wherein detecting one or more intersection edges is independent of a normal vector at each point of the scan grid pattern.

Example 10: The machine-readable storage media of example 1, wherein detecting one or more intersection edges comprises: generating a triangular mesh around a point, which is not a silhouette edge point, of the scan grid pattern with neighbor points forming shared edges between triangles of the triangular mesh; and computing normal gradient across each shared edge to determine whether the point is lying on an intersection edge of a smooth surface.

Example 11: The machine-readable storage media of example 10, wherein detecting one or more intersection edges comprises comparing a maximum normal gradient, from among the computed normal gradient across each shared edge, with a threshold of maximum normal gradient.

Example 12: The machine-readable storage media of example 1, wherein the scan pattern grid is a first scan pattern grid, wherein growing the region comprises: analyzing points in first scan pattern grid and a second scan pattern grid; and generating clusters of homogeneous points continuous in space.

Example 13: A system comprising: a memory; a processor coupled to the memory; and a communication interface coupled to the processor, wherein the processor is to: receive scan pattern information and point cloud data from a LIDAR system, wherein the scan pattern information and point cloud data are associated with a physical object; generate a scan pattern grid from the scan pattern information and point cloud data; detect one or more silhouette edges using the scan pattern grid and the point cloud data; detect one or more intersection edges using the scan pattern grid and the point cloud data; and grow a region based on the detected silhouette edge and intersection edge.

Example 14: The system of example 13, wherein the scan pattern grid is a 2-D grid structure having cells organized in rows and columns, wherein an individual row corresponds to a vertical angle of a scan from a scanner of the LIDAR system, and wherein an individual column corresponds to a horizontal angle from of the scan of the scanner of the LIDAR system.

Example 15: The system of example 13, wherein the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from of the scan from the scanner of the LIDAR system.

Example 16: The system of example 15, wherein an individual cell of the scan pattern grid represents a laser pulse from the scanner, wherein the individual cell includes information of a return point, wherein the information of the return point includes scan coordinates, color, and intensity.

Example 17: The system of example 13, wherein the one of more silhouette edges comprises points lying on an edge between an object scanned by the LIDAR system and a shadow of the object, wherein detecting one or more silhouette edges comprises: determining, from the scan pattern grid, points with no return; and identifying points in the scan pattern grid points that neighbor the points with no return as a silhouette edge points, wherein the silhouette edge points form the one or more silhouette edges.

Example 18: The system of example 13, wherein detecting one or more silhouette edges comprises: determining mixed points, between two objects, from the scan pattern grid; distinguishing silhouette edge points of the two objects from the mixed points by determining whether an incidence angle associated with a point in the scan pattern grid is on one of the two objects; comparing the incidence angle, associated with a point, against a threshold; identifying the point as a silhouette edge point if the incidence angle exceeds the threshold, wherein the silhouette edge point forms the one or more silhouette edges; and identifying the point as a mixed point if the incidence angle is below the threshold.

Example 19: A method for point cloud feature extraction and segmentation from a LIDAR system, the method comprising: receiving scan pattern information and point cloud data from the LIDAR system, wherein the scan pattern information and point cloud data are associated with a physical object; generating a scan pattern grid from the scan pattern information and point cloud data; detecting one or more silhouette edges using the scan pattern grid and the point cloud data; detecting one or more intersection edges using the scan pattern grid and the point cloud data; and growing a region based on the detected silhouette edge and intersection edge.

Example 20: The method of example 19, wherein the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from of the scan from the scanner of the LIDAR system, wherein an individual cell of the scan pattern grid represents a laser pulse from the scanner, wherein the individual cell includes information of a return point, wherein the information of the return point includes scan coordinates, color, and intensity.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having instructions stored thereon, that when executed, cause one or more processors to perform an operation for a LIDAR system where point cloud feature extraction and segmentation is performed, the operation comprising:
    receiving scan pattern information and point cloud data from the LIDAR system, wherein the scan pattern information and point cloud data are associated with a physical object;
    generating a scan pattern grid from the scan pattern information and point cloud data;
    detecting one or more silhouette edges using the scan pattern grid and the point cloud data;
    detecting one or more intersection edges using the scan pattern grid and the point cloud data; and
    growing a region based on the detected one or more silhouette edges and the one or more intersection edge, wherein detecting the one or more intersection edges comprises:
    generating a mesh around a point, which is not a silhouette edge point, of the scan pattern grid with neighbor points forming shared edges between regions of the mesh; and
    computing normal gradient across an individual shared edge to determine whether the point is lying on an intersection edge of a smooth surface.

2. The non-transitory machine-readable storage media of claim 1, wherein the scan pattern grid is a 2-D grid structure having cells organized in rows and columns, wherein an individual row corresponds to a vertical angle of a scan from a scanner of the LIDAR system, and wherein an individual column corresponds to a horizontal angle from the scanner of the LIDAR system.

3. The non-transitory machine-readable storage media of claim 1, wherein the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from the scanner of the LIDAR system.

4. The non-transitory machine-readable storage media of claim 2, wherein an individual cell of the scan pattern grid represents a laser pulse from the scanner, wherein the individual cell includes information of a return point, and wherein the information of the return point includes scan coordinates, color, and intensity.

5. The non-transitory machine-readable storage media of claim 1, wherein the one or more silhouette edges comprises points lying on an edge between an object scanned by the LIDAR system and a shadow of the object.

6. The non-transitory machine-readable storage media of claim 1, wherein detecting the one or more silhouette edges comprises:
    determining, from the scan pattern grid, points with no return; and
    identifying points in the scan pattern grid that neighbor the points with no return as silhouette edge points, wherein the silhouette edge points form the one or more silhouette edges.

7. The non-transitory machine-readable storage media of claim 1, wherein detecting the one or more silhouette edges comprises:
    determining mixed points, between two objects, from the scan pattern grid;
    distinguishing silhouette edge points of the two objects from the mixed points by determining whether an incidence angle associated with a point in the scan pattern grid is on one of the two objects;
    comparing the incidence angle, associated with a point, against a threshold;
    identifying the point as a silhouette edge point if the incidence angle exceeds the threshold, wherein the silhouette edge point forms the one or more silhouette edges; and
    identifying the point as a mixed point if the incidence angle is below the threshold.

8. The non-transitory machine-readable storage media of claim 1, wherein the one or more intersection edges intersect two or more smooth surfaces.

9. The non-transitory machine-readable storage media of claim 1, wherein detecting the one or more intersection edges is independent of a normal vector at each point of the scan pattern grid.

10. The non-transitory machine-readable storage media of claim 1, wherein the mesh is a triangular mesh around the point, and wherein the regions of the mesh are triangles of the triangular mesh.

11. The non-transitory machine-readable storage media of claim 10, wherein detecting one or more intersection edges comprises comparing a maximum normal gradient, from among the computed normal gradient across each shared edge, with a threshold of maximum normal gradient.

12. The non-transitory machine-readable storage media of claim 1, wherein the scan pattern grid is a first scan pattern grid, wherein growing the region comprises:
- analyzing points in the first scan pattern grid and a second scan pattern grid; and
- generating clusters of homogeneous points continuous in space.

13. A system comprising:
- a memory;
- a processor coupled to the memory; and
- a communication interface coupled to the processor, wherein the processor is to:
  - receive scan pattern information and point cloud data from a LIDAR system, wherein the scan pattern information and point cloud data are associated with a physical object;
  - generate a scan pattern grid from the scan pattern information and point cloud data;
  - detect one or more silhouette edges using the scan pattern grid and the point cloud data;
  - detect one or more intersection edges using the scan pattern grid and the point cloud data; and
  - grow a region based on the detected one or more silhouette edges and the one or more intersection edges,
  - wherein to detect the one or more intersection edges, the processor is to:
    - generate a mesh around a point, which is not a silhouette edge point, of the scan pattern grid with neighbor points forming shared edges between regions of the mesh; and
    - compute normal gradient across an individual shared edge to determine whether the point is lying on an intersection edge of a smooth surface.

14. The system of claim 13, wherein the scan pattern grid is a 2-D grid structure having cells organized in rows and columns, wherein an individual row corresponds to a vertical angle of a scan from a scanner of the LIDAR system, and wherein an individual column corresponds to a horizontal angle from of the scan from the scanner of the LIDAR system.

15. The system of claim 13, wherein the LIDAR system is a mobile LIDAR system, wherein the scan pattern grid is a 2-D grid structure having cells organized in rows and columns, wherein an individual row corresponds to a time of a scan from a scanner of the LIDAR system, and wherein an individual column corresponds to a scan angle from the scanner of the LIDAR system.

16. The system of claim 15, wherein an individual cell of the scan pattern grid represents a laser pulse from the scanner, wherein the individual cell includes information of a return point, and wherein the information of the return point includes scan coordinates, color, and intensity.

17. The system of claim 13, wherein the one or more silhouette edges comprises points lying on an edge between an object scanned by the LIDAR system and a shadow of the object, wherein to detect the one or more silhouette edges the processor is to:
- determine, from the scan pattern grid, points with no return; and
- identify points in the scan pattern grid points that neighbor the points with no return as a silhouette edge points, wherein the silhouette edge points form the one or more silhouette edges.

18. The system of claim 13, wherein to detect the one or more silhouette edges the processor is to:
- determine mixed points, between two objects, from the scan pattern grid;
- distinguish silhouette edge points of the two objects from the mixed points by determining whether an incidence angle associated with a point in the scan pattern grid is on one of the two objects;
- compare the incidence angle, associated with a point, against a threshold;
- identify the point as a silhouette edge point if the incidence angle exceeds the threshold, wherein the silhouette edge point forms the one or more silhouette edges; and
- identify the point as a mixed point if the incidence angle is below the threshold.

19. A method for point cloud feature extraction and segmentation from a LIDAR system, the method comprising:
- receiving scan pattern information and point cloud data from the LIDAR system, wherein the scan pattern information and point cloud data are associated with a physical object;
- generating a scan pattern grid from the scan pattern information and point cloud data;
- detecting one or more silhouette edges using the scan pattern grid and the point cloud data;
- detecting one or more intersection edges using the scan pattern grid and the point cloud data; and
- growing a region based on the detected one or more silhouette edges and the one or more intersection edge,
- wherein detecting the one or more intersection edges comprises:
  - generating a mesh around a point, which is not a silhouette edge point, of the scan pattern grid with neighbor points forming shared edges between regions of the mesh; and
  - computing normal gradient across an individual shared edge to determine whether the point is lying on an intersection edge of a smooth surface.

20. The method of claim 19, wherein the LIDAR system is a mobile LIDAR system, wherein the scan pattern grid is a 2-D grid structure having cells organized in rows and columns, wherein an individual row corresponds to a time of a scan from a scanner of the LIDAR system, wherein an individual column corresponds to a scan angle from of the scan from the scanner of the LIDAR system, wherein an individual cell of the scan pattern grid represents a laser pulse from the scanner, wherein the individual cell includes information of a return point, and wherein the information of the return point includes scan coordinates, color, and intensity.

* * * * *